US012723925B2

(12) United States Patent
Hao et al.

(10) Patent No.: US 12,723,925 B2
(45) Date of Patent: Sep. 1, 2026

(54) METALENS ARRAY AND WAVEFRONT SENSOR SYSTEM

(71) Applicant: SHENZHEN METALENX TECHNOLOGY CO., LTD, Shenzhen (CN)

(72) Inventors: Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 137 days.

(21) Appl. No.: 18/731,338

(22) Filed: Jun. 2, 2024

(65) Prior Publication Data

US 2024/0319016 A1 Sep. 26, 2024

Related U.S. Application Data

(63) Continuation of application No. PCT/CN2022/142371, filed on Dec. 27, 2022.

(30) Foreign Application Priority Data

Dec. 28, 2021 (CN) ......................... 202111633102.3

(51) Int. Cl.
*G02B 3/00* (2006.01)
*G01J 9/00* (2006.01)
*G02B 1/00* (2006.01)

(52) U.S. Cl.
CPC ................ *G01J 9/00* (2013.01); *G02B 1/002* (2013.01); *G02B 3/0043* (2013.01); *G01J 2009/002* (2013.01)

(58) Field of Classification Search
CPC ...... G01J 9/00; G01J 2009/002; G02B 1/002; G02B 3/0043; G02B 1/00; G02B 3/00; G01M 11/02
(Continued)

(56) References Cited

U.S. PATENT DOCUMENTS

2016/0306079 A1* 10/2016 Arbabi ................. G02B 5/0268
2017/0059446 A1* 3/2017 Maeda ...................... G01J 9/00
(Continued)

FOREIGN PATENT DOCUMENTS

CN 112505009 3/2021
CN 113589535 11/2021
(Continued)

OTHER PUBLICATIONS

"International Search Report (Form PCT/ISA/210) of PCT/CN2022/142371," mailed on Mar. 13, 2023, with English translation thereof, pp. 1-6.

*Primary Examiner* — Isiaka O Akanbi
(74) *Attorney, Agent, or Firm* — JCIPRNET

(57) ABSTRACT

Provided is a metalens array and a wavefront sensor system, and the metalens array includes: at least a metalens array unit; and the metalens array unit includes: a transmittive metalens array, the transmittive metalens array includes: a plurality of transmittive metalens at different working waveband, and the plurality of transmittive metalens have the same focal length and can be used for focusing incident lights of different wavelengths to different positions of a first plane. According to the present disclosure, a plurality of transmittive metalens with different working wavelengths may focus the light of different wavelengths at different positions in the focal plane and obtain the focal point offset of different wavelengths, so as to calculate wavefront of multiple wavelengths.

18 Claims, 10 Drawing Sheets

(58) Field of Classification Search
USPC .......................................... 356/121, 124, 138
See application file for complete search history.

(56) References Cited

U.S. PATENT DOCUMENTS

| | | | | |
|---|---|---|---|---|
| 2017/0082263 | A1* | 3/2017 | Byrnes | B82Y 20/00 |
| 2018/0274750 | A1* | 9/2018 | Byrnes | F21V 5/002 |
| 2019/0196068 | A1* | 6/2019 | Tsai | G02B 1/002 |
| 2023/0208104 | A1* | 6/2023 | Tamagnone | H01S 5/141<br>372/20 |

FOREIGN PATENT DOCUMENTS

| | | |
|---|---|---|
| CN | 215010478 | 12/2021 |
| WO | 2021226544 | 11/2021 |
| WO | 2021233416 | 11/2021 |

* cited by examiner

860nm

METALENS ARRAY AND WAVEFRONT SENSOR SYSTEM

CROSS-REFERENCE TO RELATED APPLICATION

This application is a continuation of International Patent Application of PCT application serial No. PCT/CN2022/142371, filed on Dec. 27, 2022, which claims the benefit of priority from China Application No. 202111633102.3, filed on Dec. 28, 2021. The entirety of each of the above mentioned patent applications is hereby incorporated by reference herein and made a part of this specification.

TECHNICAL FIELD

The present disclosure relates to the field of wavefront detection and correction, in particular to a metalens array and a wavefront sensor system.

BACKGROUND

Wavefront sensor is a device used to obtain the incident light wavefront information, which is widely used in the quality evaluation of optical components and also used in high-energy laser evaluation system, laser modulation system, adaptive astronomical observation system, and ophthalmic disease analysis system. With the rapid development of the adaptive optics field, the wavefront sensor highlights its importance, and has become an indispensable and important component in the adaptive optics systems. Among the existing wavefront detection techniques, the Shack-Hartmann method is the most effective and robust technology.

Shack-Hartmann wave-front sensor is combined by a single micro-lens array and a single image detector. The micro-lens array decomposes the wavefront into a mico-beam and each of the mico-beam focuses on an image detection (placed at the focal plane of the micro-lens array). If a uniform plane wavefront is incident on the Shack-Hartmann wave-front sensor, each micro-lens forms a spot along its optical axis, which creates a regular spot array on the image detector, and the spot array can be used as a calibration position. However, a distortion wavefront incident will cause the focal spot off-set of the focal plane, which will make the focal spot deviate from the optical axis of the micro-lens, or even the focal spot absent.

Due to the advantages of low cost, simple structure, light weight and high capacity in replacing micro-lens arrays with metalens, the metalens is replacing the micro-lens array in the Shack-Hartmann wave-front sensor to measure the parameters, such as wavefront distortion and polarization.

Although the metalens has been used in the field of Shack-Hartmann wavefront detection, the wavefront detection hasn't involved the detection of different wavelengths, reflective imaging, and real-time correction of the wavefront at different wavelengths.

SUMMARY

In view of the above technical problems, a metalens array and a wavefront sensor system is provided according to embodiments of the present disclosure, so as to overcome the problems in the related art.

According to the one aspect of the present disclosure, a metalens array is provided, where the metalens array includes: at least a metalens array unit; a transmittive metalens array, the transmittive metalens array includes: a plurality of transmittive metalens at different working waveband, and the plurality of transmittive metalens have the same focal length and can be used for focusing incident lights of different wavelengths to different positions of a first plane.

Optionally, the array unit further includes: at least a reflective metalens, the reflective metalens is used to reflect the incident light to a second plane, and the second plane is different from the first plane.

Optionally, the reflective metalens is a full-spectrum reflective metalens.

Optionally, the metalens array unit includes three square transmittive metalenses, and one square reflective metalens.

Optionally, the metalens array unit includes six hexagon transmittive metalenses and one hexagon reflective metalens.

Optionally, the phase distribution of the reflective metalens is as following:

$$\begin{cases} \varphi_r(x, y) = \frac{2\pi}{\lambda}\left(f - \sqrt{(x-x_f)^2 + (y-y_f)^2 + z_f^2} + \pi\right) \\ f = \sqrt{x_f^2 + y_f^2 + z_f^2} \end{cases}$$

where, (xf,yf,zf) is the reflective metalens focuses the light on the focal point of a sensor, and f is the focal length of the reflective metalens.

Optionally, the phase distribution of the transmittive metalens is as following:

$$\varphi_{ML}(x, y) = \frac{2\pi}{\lambda_i}\left(f_{ML} - \sqrt{(x-x_f)^2 + (y-y_f)^2 + f_{ML}^2}\right)$$

λi is the working wavelength of the transmittive metalens, fML is the focal length of the transmittive metalens, and (xf, yf) is the coordinates corresponding to the center of the transmittive metalens.

According to another aspect of the present disclosure, a wavefront sensor system is provided, where the wavefront sensor system includes: a metalens array and a first sensor; the metalens array includes: at least one metalens array unit, and the metalens array unit includes: a plurality of transmittive metalens at different working waveband; the first sensor includes: a plurality of first sensor units; the plurality of transmittive metalens with the same focal length can be used for focusing incident lights of different wavelengths to the corresponding first sensor unit of the first senor; the arrangement of the first sensor unit corresponds one to one to the arrangement of the metalens array unit, and each of the first sensor units contains a focal reference point, the first sensor is used to detect the deviation between the actual focal point of each transmittive metalens and the focal reference point, the focal reference point is the theoretical focal point of the transmittive metalens on the corresponding sensor unit.

Optionally, the first sensor is arranged at the focal plane of the transmittive metalens array of the metalens array.

Optionally, the metalens array unit further includes: at least one reflective metalens; the wavefront sensor system further includes: a second sensor; at least one reflective metalens can be used for reflecting the incident light to the second metalens; the second sensor is used for imaging of reflected lights of the reflective metalens.

Optionally, the reflective metalens is used to image by off-axis reflection.

Optionally, the wavefront distortion calculated by the transmittive metalens can correct the image of the reflective metalens, so as to obtain a clear image.

Optionally, the wavefront sensor system further includes: a computing device, the computing device is used for calculating the wavefront distortion of different wavelengths of the incident light by the deviation between the actual focal point and the reference focal point, where the wavefront distortion is obtained by the following formula:

$$\frac{\partial W(\bar{x},\bar{y})}{\partial x}=\frac{\Delta x(\bar{x},\bar{y})}{f_{ML}},$$
$$\frac{\partial W(\bar{x},\bar{y})}{\partial y}=\frac{\Delta y(\bar{x},\bar{y})}{f_{ML}}$$

where, $W(\bar{x}, \bar{y})$ is the wavefront distortion, $(\bar{x}, \bar{y})$ is the phase of the focal reference point, $f_{ML}$ is the focal length of the transmittive metalens, $\Delta x(\bar{x}, \bar{y})$ and $\Delta y(\bar{x}, \bar{y})$ is the offset components in the x, y direction, respectively.

Optionally, the computing device is used for calculating the wavefront distortion of light at different wavelengths in the incident light by measuring the deviation between the actual focal point and the focal reference point, and the calculated wavefront distortion can be applied to the imaging of the second sensor, so as to obtain a recovery image that recovered by the wavefront distortion.

Optionally, the wavefront sensor system further includes: an optical filter; the optical filter is used for filtering the light before the light reaches the metalens array unit, so as to allow only a light of specific wavelength to incidence to the metalens array unit.

Optionally, the wavefront sensor system further includes: an optical filter; the optical filter is used for filtering the light before the light reaches the metalens array unit, so as to allow only a light of specific wavelength incidence to the metalens array unit.

Optionally, the optical filter further includes: a filter array; the filter array is configured one-to-one correspondence with the transmittive metalens and the reflective metalens.

Optionally, the metalens array unit includes: six hexagonal transmittive metalenses and one hexagonal reflective metalens.

Optionally, the metalens array unit includes: three square transmittive metalenses and one square reflective metalens.

Optionally, an aperture stop array is arranged between the metalens array and the first sensor.

According to the present disclosure, a plurality of transmittive metalens at different working waveband have the same focal length and can be used for focusing incident lights of different wavelengths to different positions of a first plane, so as to obtain offset of the focal points at different wavelengths and calculate different wavefront of different wavelengths.

BRIEF DESCRIPTION OF THE DRAWINGS

The present disclosure may be better understood by reference to the description given below in combination with the drawings, where the same or similar markings are used in all the drawings to represent the same or similar components. The drawings are included in the specification along with the following detailed description and form part of the specification, and to further illustrate the preferred embodiments of the disclosure and explain the principles and advantages of the disclosure.

Figure 1:
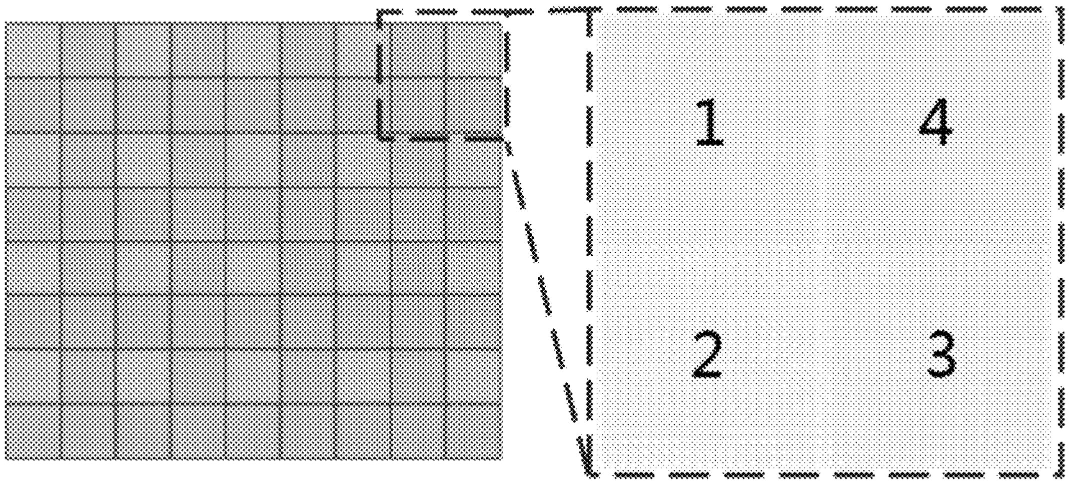
FIG. 1 shows a schematic diagram of a metalens array provided by an embodiment of the present disclosure.

Those skilled in the art should understand that the elements in the accompanying drawings are shown only for simplicity and clarity, and are not necessarily to be drawn to scale. For example, the dimensions of some elements in the drawings may be enlarged relative to others in order to improve understanding of embodiments of the disclosure.

DETAILED DESCRIPTION OF DISCLOSURED EMBODIMENTS

The technical scheme in the embodiment of this application will be clearly and completely described in combination with the attached drawings of the present application method. Obviously, the implementation method described clearly is only part of the implementation method of the present disclosure, rather than all of the implementation methods. Based on the mode of implementation in this application, all other modes of implementation obtained by persons skilled in the field without making creative labor fall within the scope of protection in this disclosure.

It should be understood that terms used in the present disclosure, such as “central”, “longitudinal”, “transverse”, “length”, “width”, “thickness”, “upper”, “lower”, “front”, “rear”, “left”, “right”, “vertical”, “horizontal”, “top”, “bottom”, “interior”, “exterior”, “clockwise”, “counterclockwise” which are intended to indicate orientational or positional relationships based on the accompanying drawings are only for the purpose of describing the present disclosure conveniently and simply, and are not intended to indicate or imply a particular orientation, a structure and an operation in a particular orientation of the device or element referred to herein, and thus are not to be interpreted as a limitation to the present disclosure.

In addition, terms “first” and “second” are used for descriptive purposes, and are not intended to indicate or imply relative importance or implicitly indicate the quantity of the indicated technical features. Therefore, features defined by “first” or “second” may explicitly or implicitly include one or more of these features. In the description of the present disclosure, “plurality” or “multiple” means that there are two or more of these features, unless otherwise explicitly and specifically defined.

In this disclosure, the word “exemplary” is used to mean “used as an example, illustration or explanation”. Any embodiment described in this disclosure is not necessarily interpreted as more preferred or advantageous than other embodiments. In order to enable anyone skilled in the art to implement and use the present disclosure, the following description is given. In the following description, the details are listed for the purpose of the interpretation. It should be understood that those skilled in the art may recognize that the present disclosure may also be implemented without using these specific details. In other examples, the known structure and process will not be elaborated to avoid unnecessary details to obscure the description of this disclosure. Therefore, the present disclosure is not intended to be limited to the embodiment shown, but is consistent with the broadest scope consistent with the principles and characteristics disclosed in the present disclosure.

Metalens Array

According to the embodiment of the disclosure, a metalens array is provided that is able to utilize the wavefront detection at different wavelengths. FIG. 1 shows a schematic of a metalens array according to an embodiment of the present disclosure. As shown in FIG. 1, the metalens array includes: at least a metalens array unit. An enlarged view of a metalens array unit is shown in the right side of FIG. 1. The number of the metalens array units in the metalens array have no restriction, such as, 10×10.

As shown in the right side of FIG. 1, the metalens array unit includes: a transmittive metalens array. The transmittive metalens array includes: a plurality of transmittive metalens at different working waveband. And the plurality of transmittive metalens have the same focal length and can be used for focusing different wavelengths of incident light to different positions of a first plane. Four metalenses are illustrated in the right side of FIG. 1, but the number of metalenses that the metalens array unit contained is not limited, and those skilled in the art may use other numbers of transmittive metalenses according to actual needs.

According to the embodiment of the present disclosure, the plurality of transmittive metalens have the same focal length and can be used for focusing different wavelengths of incident light to different positions of a focal plane, so as to obtain focus shift of lights of different wavelengths. Thus the wavefront of different wavelengths can be calculated by the focus shift of lights of different wavelengths.

In one optional embodiment, the metalens array unit further includes: at least a reflective metalens, the reflective metalens is used to reflect the incident light to a second plane, and the second plane is different from the first plane. The reflective metalens is a full-spectrum reflective metalens. There is also no limitation on the number of the reflective metalens that a metalens array unit may contain.

That is to say, the metalens array unit includes a reflective metasurface array, the reflective metasurface array is used to image by off-axis reflection. Thus, the image information is obtained simultaneously. And the distortion image caused by the wavefront distortion can be corrected in real-time (digital image processing) by the results obtained from the wavefront detection, so as to get a clear image. The specific calculation method of focal offset and wavefront will be detailed below with reference to FIG. 6. Thus, the metalens array according to the embodiment of the present disclosure can perform reflective imaging and real-time correction of the image.

In addition, the metalens is processed by semiconductor technology, which has the advantages of low cost and high capacity, so using the metalens in wavefront detection can make the wavefront detection correction system have a cost advantage compared with the traditional system.

For example, the arrangement of the reflective metalens in the metalens array unit is shown in FIG. 1, and the metalens may be set as following: No. 1, No. 2 and No. 3 metalens are transmittive metalenses, and No. 4 metalens is a reflective metalens. The No. 1, No. 2 and No. 3 transmittive metalens focus the wavelengths of $\lambda_1$, $\lambda_2$, $\lambda_3$ to the focal points in the focal plane with the same focal length, respectively. The wavefront of $\lambda_1$, $\lambda_2$, $\lambda_3$ through the metalens array can be calculated by the offset between the actual focal points and the focal reference point. No. 4 metalens is used to image by off-axis reflection. Due to the distortion in the incident light wavefront, the image of No. 4 reflective metalens is distorted. The wavefront distortion calculated by the transmittive metalens can correct the image of the No. 4 reflective metalens, so as to obtain a clear image.

The metalens array units can be arranged in periodicity. For example, FIG. 1 illustrates an example of the metalens array units arranged in a square periodicity. As shown in FIG. 1, there are four metalenses to form a metalens array unit. The embodiment shown in FIG. 1 are only examples, and the numbers of transmittive metalens and reflective metalenses have no restriction. Also, the shapes of the transmittive and reflective metalenses are not restricted. Also, the positions of the transmittive and reflective metalenses are not restricted.

Figure 2:
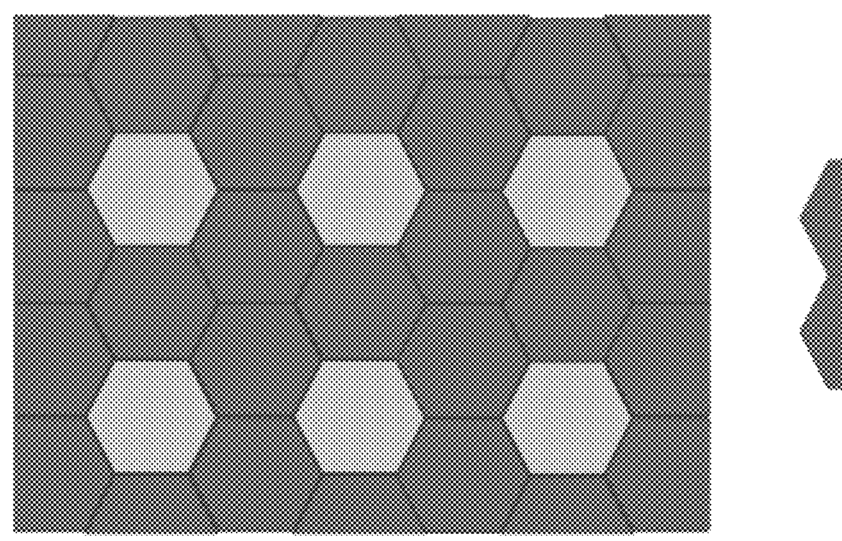
FIG. 2 shows a schematic diagram of another structure of a metalens array provided by an embodiment of the present disclosure.
Figure 2:
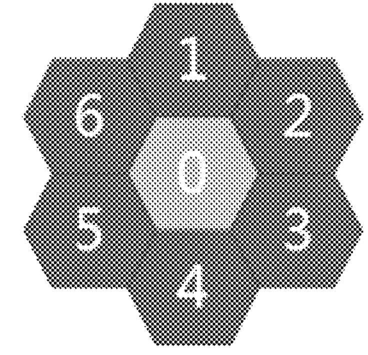

As shown in FIG. 2, a schematic diagram of another structure of the metalens array is as an embodiment. As shown in FIG. 2, the metalens array may be in a periodic arrangement having a plurality of regular hexagons. As shown in FIG. 2, there are seven regular hexagonal metalenses to form a metalens array unit. In one embodiment, No. 1, No. 2, No. 3, No. 4, No. 5 and No. 6 transmittive metalens focus the wavelengths of $\lambda_1$, $\lambda_2$, $\lambda_3$, $\lambda_4$, $\lambda_5$, $\lambda_6$ to the focal points in the focal plane with the same focal length, respectively. The wavefront of $\lambda_1$, $\lambda_2$, $\lambda_3$, $\lambda_4$, $\lambda_5$, $\lambda_6$ through the metalens array can be calculated by the offset between the actual focal points and the focal reference point. No. 0 metalens is a reflective metalens, and No. 0 metalens is used to image by off-axis reflection. Due to the distortion in the incident light wavefront, the image of No. 0 reflective metalens is distorted. The wavefront distortion calculated by the transmittive metalens can correct the image of No. 4 reflected metalens, so as to obtain a clear image. Compared to the square arrangement, the regular hexagon arrangement will use 13% less metalens in the same area.

Those skilled in the art may also use other shaped metalens or more reflective metalens for actual needs, where the disclosure is not restricted.

In addition to the positions shown in FIG. 1 and FIG. 2, the reflective metalens may also be set in other locations. In addition, there may be a seamless connection between the adjacent metalenses and the adjacent metalens array units as shown in FIG. 1 and FIG. 2. But the present disclosure is not limited to this, and those skilled in the art can set the presence or absence/size of the gap according to actual needs.

Specific Structure of Metalens

Figure 3:
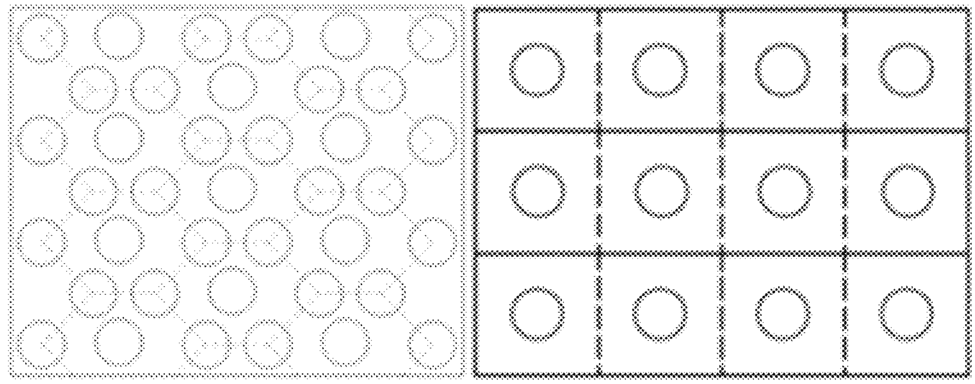
FIG. 3 shows a schematic diagram of a specific structure of a metalens provided by an embodiment of the present disclosure.

FIG. 3 shows a specific structure that the metalens can use.

FIG. 3 shows an arrangement diagram of the unit cell of the metalens. Metasurface is a sub-wavelength artificial nano-structured film. The incident light can be modulated according to the unit cells (nano-structure unit) of the metasurface. And the unit cells are arranged in arrays, and the shape of the unit cells may be regular hexagon or/and square, or may be other shapes. FIG. 3 provides an arrangement diagram of the unit cell in regular hexagon and square.

The central position of each unit cell, or the central position and the vertex position of each unit cell has a nanostructure, respectively. The unit cells of the metalens contain full dielectric medium or plasma nanoantennas, which can directly modulate characteristics of light such as the phase, amplitude and polarization. In the present disclosure, the nanostrucures are full dielectric medium units, which has high transmittance at working waveband. And the optical materials include: titanium oxide, silicon nitride, molten quartz, alumina, gallium nitride, gallium phosphates, amorphous silicon, crystalline silicon, germanium, sulphur glass, etc. The amorphous silicon may be hydrogenated amorphous silicon.

The working wavebands of the transmittive metalens can be visible light (380~760 nm), near-infrared, mid-infrared, and far-infrared bands. The filler materials between the nanostructures may be air or other transparent or translucent materials at the working waveband. It should be noted that the absolute value of the difference between the refractive index of this material and the refractive index of the nanostructure should be greater than, or equal to 0.5.

Figure 4:
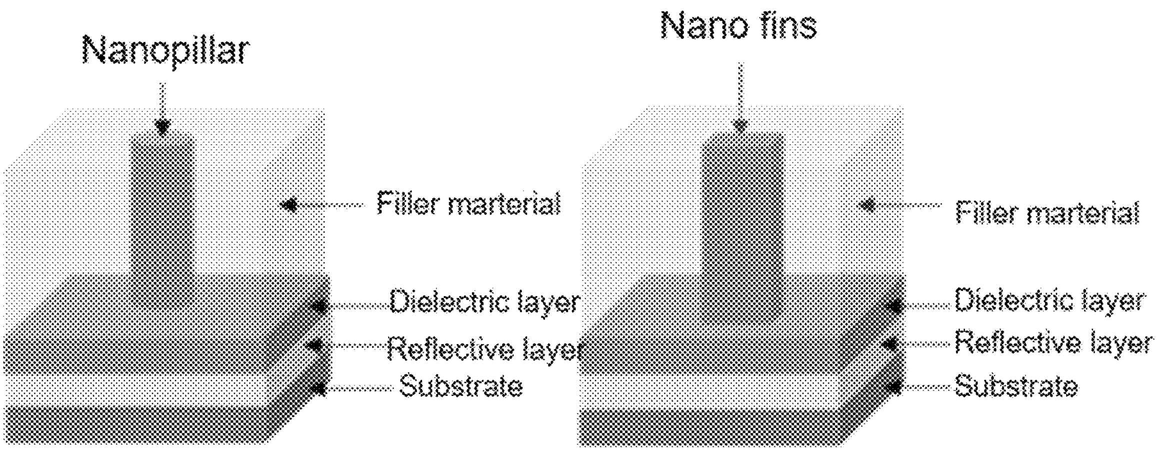
FIG. 4 shows a schematic diagram of a structure of a reflective metasurface provided by an embodiment of the present disclosure.

The structure of the reflective metalens is shown as FIG. 4, including a substrate (may be non-transparency), a reflective layer, a dielectric layer and a nanostructure layer.

Wavefront Sensor System

Figures 5A, 5B:
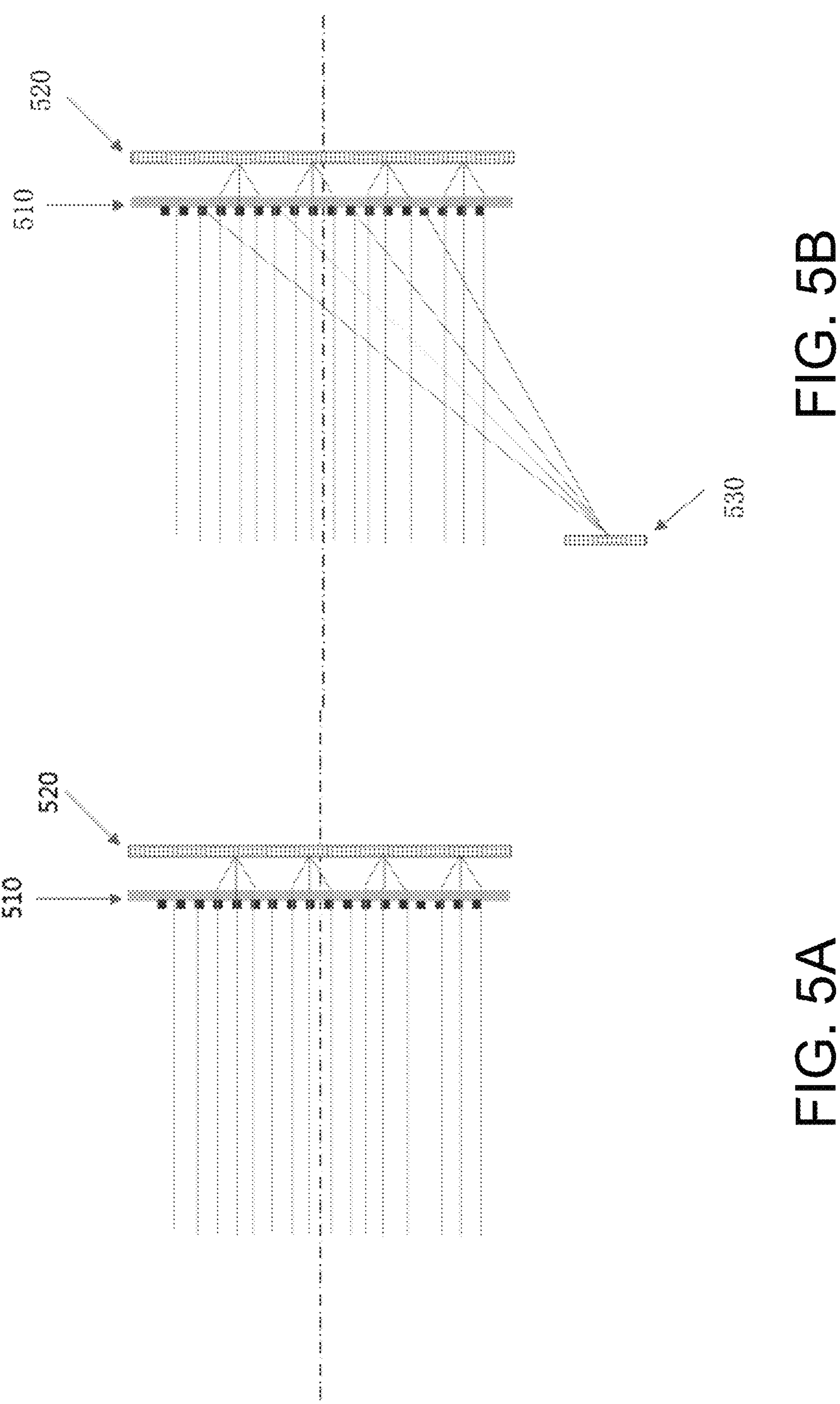
FIG. 5A and FIG. 5B show schematic diagrams of a structure of a reflective metasurface provided by an embodiment of the present disclosure.

According to the embodiment of the present disclosure, a wavefront sensor system is provided. FIG. 5A shows a schematic of the wavefront sensor system. As shown in FIG. 5A, the wavefront sensor system includes: a metalens array 510. The metalens array 510 includes: at least a metalens array unit. And the metalens array unit includes: a transmittive metalens array. The transmittive metalens array includes: a plurality of transmittive metalens at different working waveband, and the plurality of transmittive metalens have the same focal length and can be used for focusing the incident light of different wavelengths to different positions of the corresponding sensor units in the first senor 520.

A first sensor 520, the first sensors includes: a plurality of first sensor units, the arrangement of the first sensor unit corresponds one to one to the arrangement of the metalens array unit, and each of the first sensor units contains a focal reference point. Each transmittive metalens should focus the parallel light of different wavelengths to the different sensor units of the first senor 520. And the theoretical position that should be focused is the focal reference point, which can be located at the central position. However, in practice, the position of the actual focus will generally deviate from the focal reference point. The wavefront distortions of light at different wavelengths can be calculated by the deviation between the actual focal point and focal reference points. The first sensor 520 is used to detect the deviation between each actual focal point and each focal reference point. The first sensor 520 is used to detect the deviation between the actual focal point of each transmittive metalenses and the focal reference point.

It should be understood that the first sensor is arranged at the focal plane of the transmittive metalens array of the metalens array.

Further, the metalens array unit further includes: at least one reflective metalens; the reflective metalens can be used for reflecting the incident light to the second metalens. Accordingly, as shown in FIG. 5B, the wavefront sensor system may further include: a second sensor 530; the second sensor 530 is used for imaging of reflected lights of the reflective metalens.

The first sensor 520 and the second sensor 530 may be any imaging sensor which is responsive at the working waveband. For example, at the working waveband of the visible light and near-infrared, the first sensor 520 and the second sensor 530 may be CMOS or CCD.

Further, the wavefront sensor system shown in FIG. 5A and FIG. 5B may also be provided with a computing device, and the computing device can be used to calculate the wavefront distortion of the incident lights of different wavelengths by the deviation between the actual focal points and the focal reference points. The actual focal points are the incident lights of different wavelengths focusing to the positions of the first sensor 520.

Further, the computing device may also apply the calculated wavefront distortion to the imaging of the second sensor, so as to obtain a recovery image that recovered by the wavefront distortion. The calculation process of the wavefront distortion may be as following: the point spread function is inverse calculated by the wavefront distortion, and the second sensor obtains the deconvolution function of the point spread function of the distorted image, so as to obtain a clear image.

The above computing device may be a traditional computing device, such as a computer, or an MCU that is integrated in a wavefront sensor system.

The specific process of calculating the wavefront distortion is described below.

Figure 6:
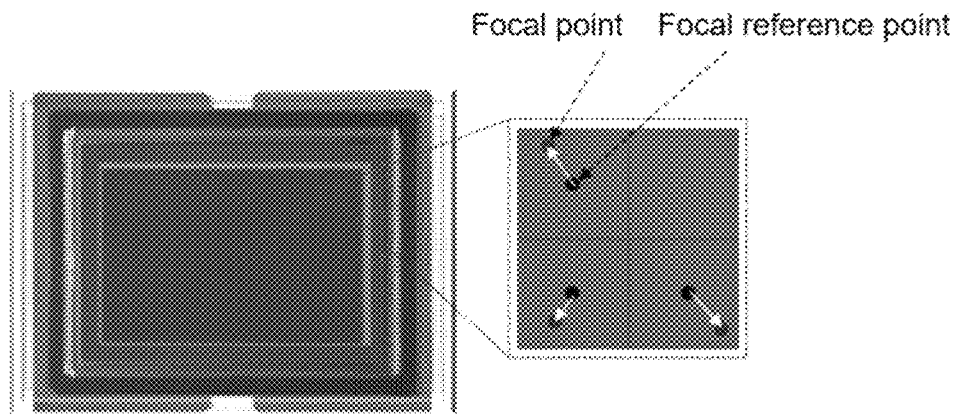
FIG. 6 shows a schematic diagram of a specific arrangement of a first sensor provided by an embodiment of the present disclosure.

FIG. 6 illustrates a specific arrangement of the first sensor 520. In the example shown in FIG. 6, the assumed metalens array unit is shown in FIG. 1 as a square metalens array unit containing a plurality of square metalenses. As shown in FIG. 6, the arrangement of a plurality of first sensor units corresponds one to one to the metalens array unit. The lights through the No. 1, No. 2, and No. 3 transmittive metalenses focus to the upper left, lower left, and lower right unit blocks of the first sensor unit.

The incident wavefront focuses to three actual focal points on the first sensor 520, and the three actual focal points deviate from the center of the first sensor 520. The wavefront of the λ1 λ λ2 、 λ3 may be inverse calculated by the deviation between the three actual focal points and the focal reference point. The focal reference point is located at the center of the first sensor unit. FIG. 6 shows that the first sensor unit has a focal reference point within each unit block corresponding to the transmittive metalens (i.e. there are three focal reference points in all). But the present disclosure is not limited to this. For example, there may be only one focal reference point set in the first sensor unit, and the wavefront can be inverse calculated by the deviation between each actual focus point and the focal reference point.

The calculation process of the wavefront.

The specific process of calculating the wavefront by the deviation between the focal point and the focal reference point shown in FIG. 6 is described below.

The wavefront slope at each wavelength may be calculated by inputting the displacement between the focal reference point and the actual focal point into a partial differential equation of the wavefront:

$$\frac{\partial W(\bar{x},\bar{y})}{\partial x} = \frac{\Delta x(\bar{x},\bar{y})}{f_{ML}}, \quad \frac{\partial W(\bar{x},\bar{y})}{\partial y} = \frac{\Delta y(\bar{x},\bar{y})}{f_{ML}} \tag{2}$$

Where $(\bar{x}, \bar{y})$ is the phase of the focal reference point, $W(\bar{x}, \bar{y})$ is the wavefront distortion, $f_{ML}$ is the focal length of the transmittive metalens, $\Delta x(\bar{x}, \bar{y})$ and $\Delta y(\bar{x}, \bar{y})$ is the offset components in the x, y direction, respectively.

The wavefront distortion may be decomposed into Zernike polynomial as shown in equation (3):

$$W(\bar{x},\bar{y}) = \sum_{i=1}^{M} a_i Z_i(\bar{x},\bar{y}) \tag{3}$$

M is a number of the order of the Zernike polynomial, $Z_i(\bar{x}, \bar{y})$ is the $i^{th}$ order of the Zernike polynomial, $a_i$ is the $i^{th}$ order of the Zernike polynomial coefficient. The equation (3) is applied to the equation (2) and obtains:

$$\frac{\Delta x(\bar{x},\bar{y})}{f_{ML}} = \sum_{i=1}^{M} a_i \frac{\partial Z_i(\bar{x},\bar{y})}{\partial x}, \quad \frac{\Delta y(\bar{x},\bar{y})}{f_{ML}} = \sum_{i=1}^{M} a_i \frac{\partial Z_i(\bar{x},\bar{y})}{\partial y} \tag{4}$$

The equation (4) may be written in the matrix form, as following:

$$\frac{1}{f_{ML}} \cdot d = B \cdot a \tag{5}$$

d is the offset of the 2N×1; N (vector dimension) is the number of transmittive metalenses used to sample the wavefront at a certain wavelength; a is the Zernike polynomial coefficient of the M×1 dimension; and the matrix B is a differential of Zernike polynomial with a dimension of 2N×M. And a, the Zernike polynomial coefficient can be obtained from equation (6):

$$a = \left(B^T \cdot B\right)^{-1} \cdot B^T \cdot d \tag{6}$$

The reflective metalens focuses the light to $(x_f, y_f, z_f)$, $(x_f, y_f, z_f)$ is the focal point of the sensor, so as to obtain the phase of the reflective metalens as following:

$$\begin{cases} \varphi_r(x, y) = \frac{2\pi}{\lambda}\left(f - \sqrt{(x-x_f)^2 + (y-y_f)^2 + z_f^2} + \pi\right) \\ f = \sqrt{x_f^2 + y_f^2 + z_f^2} \end{cases} \tag{7}$$

Where, f is the focal length of the reflective metalens.

The phase of a single transmittive metalens is shown in equation (8):

$$\varphi_{ML}(x, y) = \frac{2\pi}{\lambda_i}\left(f_{ML} - \sqrt{(x-x_f)^2 + (y-y_f)^2 + f_{ML}^2}\right) \tag{8}$$

$\lambda_i$ is the working wavelength of the transmittive metalens, $f_{ML}$ is the focal length of the transmittive metalens, and (xf, yf) is the coordinates corresponding to the center of the transmittive metalens.

The embodiments of the present disclosure provides a disclosure of a wavefront detection that integrated with the filter and metalens arrays. On the one hand, a plurality of transmittive metalens at different working waveband can be used for focusing incident lights of different wavelengths to different positions of the focal plane, so as to obtain the focus offset at different wavelengths and calculate the wavefront at different wavelengths. On the other hand, the metalens array includes the reflective metalens array, and the reflective metalens is used to image by off-axis reflection. And the distortion image resulted from the wavefront distortion can be corrected in real time (digital image processing) by the results obtained from the wavefront detection, so as to get a clear image.

During processing, the metalens has smaller volume and can be packaged with the image sensor, so that the whole system is smaller and lighter. At the same time, the metalens is processed by semiconductor process, so the metalens has the advantages of low cost and high capacity. Therefore, the metalens in the wavefront sensor correction system has an advantage of lower cost over the traditional system.

Figure 7A:
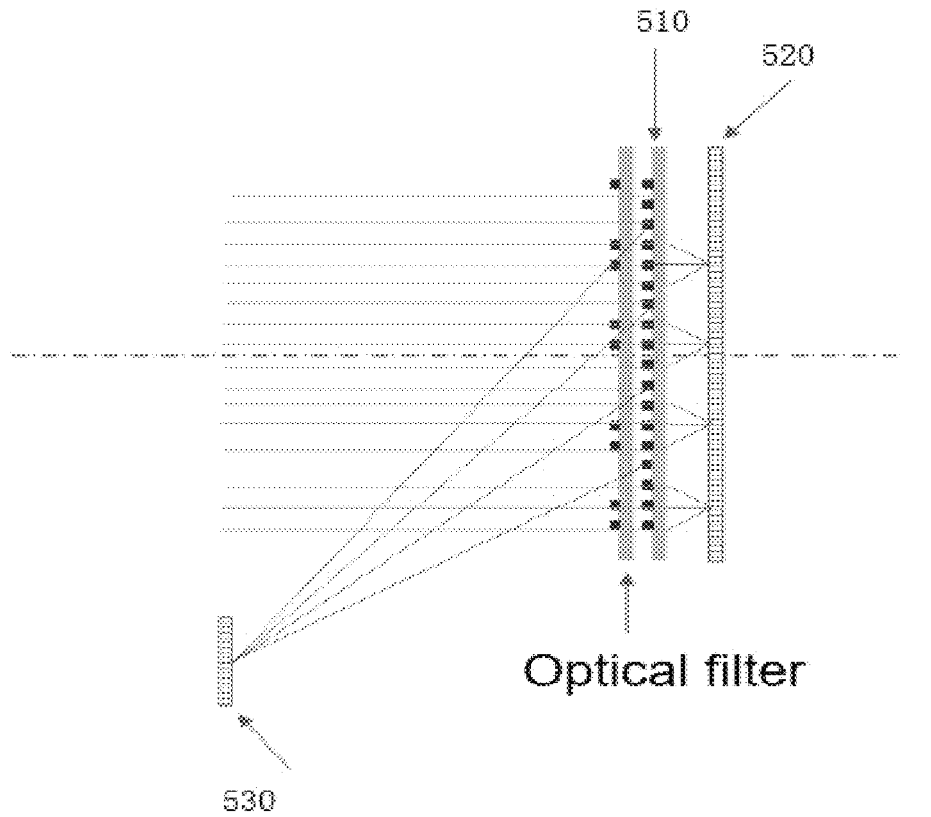
FIG. 7A, FIG. 7B and FIG. 7C show the embodiments after setting an optical filter, and the specific arrangement of the optical filter.

According to the embodiment of the disclosure, prior to the above metalens array, an optical filter is set up for filtering the light before the light reaches the metalens array unit, so as to allow only a light of specific wavelength to incidence to the metalens array unit. FIG. 7A shows a schematic diagram of the wavefront sensor system with the optical filter.

The metalens may be packaged with the optical filter and the image sensor at the wafer level. In FIG. 7A, the optical filter, the transmittive and reflective metalens array are installed tightly together, but the embodiment is not limited to this.

The optical filer may include a filter array, and the filter array is installed one-to-one correspondence with the transmittive metalens and the reflective metalens. The filter may be a narrow band filter. The narrow band filter is taken as an example to describe the specific arrangement of the optical filter.

Figure 7B:
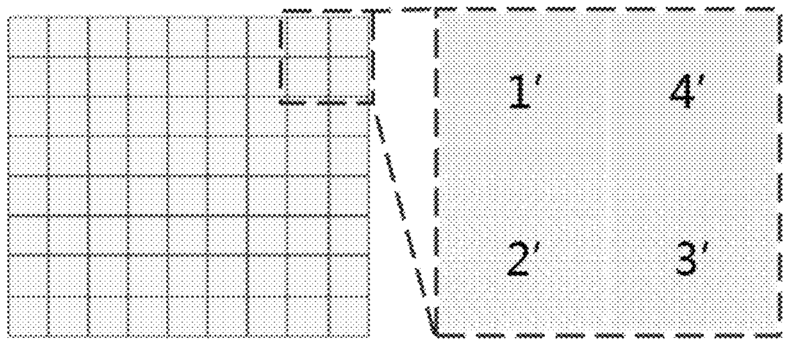
Figure 7C:
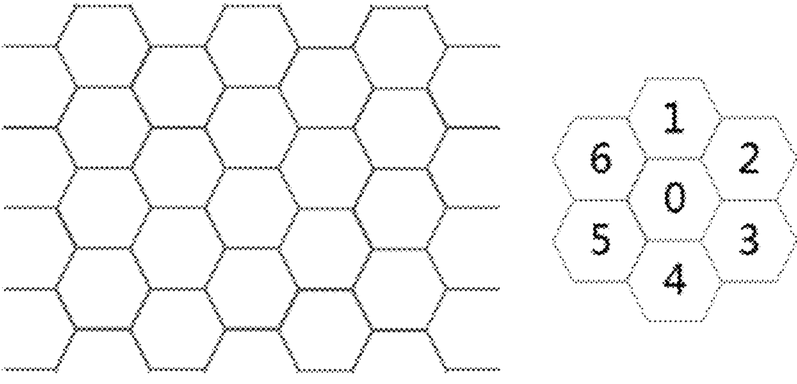

FIG. 7B and FIG. 7C show the specific arrangement of the optical filter. In FIG. 7B and FIG. 7C, the narrow band filter, the transmittive and reflective metalens array are in one-to-one correspondence. The following specifically describes this one-to-one correspondence. In FIG. 7B, corresponding to the arrangement of the metalens array as shown in FIG. 1, the filters are also arranged in a square cycle. The filters No. 1', No. 2', No. 3' are narrow band filters with central wavelengths of $\lambda_1$, $\lambda_2$, $\lambda_3$, respectively. Optionally, $\Delta\lambda/\lambda$, the ratio of the bandwidth $\Delta\lambda$ to the center wavelength of $\lambda$ may be less than 5%. After passing the narrow band filter, the incident wavefront passes through the corresponding transmittive metalens and focuses on the same focal plane (as mentioned above, each transmittive metalens has the same focal length). The No. 4' is an optical window that non-selectively transmits the incident light to the corresponding reflective metalens No. 4 without absorption. The reflective metalens No. 4 reflects the incident light off-axis to the focal plane of the second sensor to obtain an image of the entire incident scene. Similarly, as shown in FIG. 7C, the arrangement of the narrow band filter may correspond one to one as the regular hexagonal arrangement shown in FIG. 2.

It should be understood that the shape of the filter array is not limited to that shown in FIG. 7B and FIG. 7C, and those skilled in the art can also adopt other shapes and arrangement methods according to actual needs.

Aperture Stop Array

Figure 8:
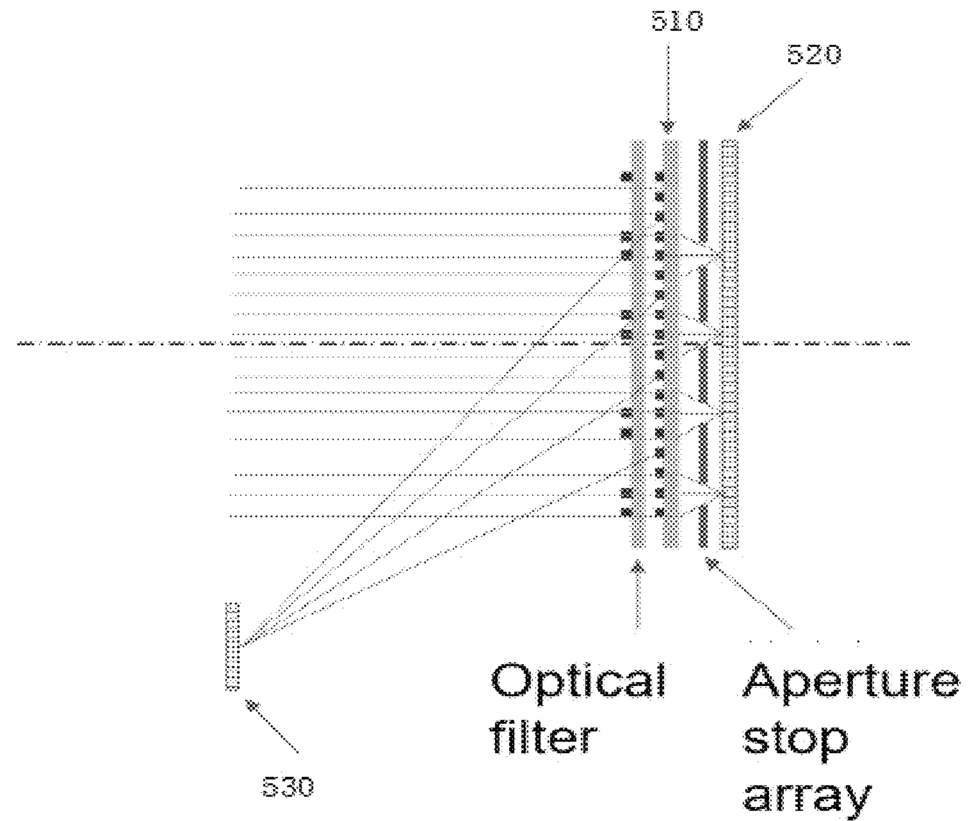
FIG. 8 shows a schematic diagram of a wavefront sensor system after setting an aperture stop.

According to the embodiment of the disclosure, an aperture stop array may be arranged between the metalens array and the first sensor as shown in FIG. 5A and FIG. 5B. FIG. 8 shows a schematic diagram of a wavefront sensor system that is arranged with the aperture stop in front of the first sensor as shown in FIG. 5B. The arrangement of the aperture stop array can remove the crosstalk phenomenon. An example of the potential for causing crosstalk is described below.

The p is the period of the transmittive metalens, H is a ratio of the p to the focal length of the metalens, and the equation (1) shown as following:

$$H = \mathrm{int}\left(\frac{p^2}{2\lambda f_{ML}}\right) \tag{1}$$

The int ( ) represents consolidation, p is the period of the transmittive metalens, λ is the metalens working wavelength, and fML is the focal length of the metalens.

If the transmittive metalens has a smaller F-number and H is greater than 20, there is no crosstalk between the adjacent metalenses (the focal point of the No. 1 metalens will not focus to the focal plane corresponding to the adjacent No. 2 metalens at any case of the wavefront curvature).

When H is less than 20 (the most common value is about 4) and the incident wavefront curvature (1/R, R is radius) is less than a threshold Φ, the wavefront sensor is preferably suitable for wavefront sensor that the wavefront curvature is greater than the threshold. Alternatively, the aperture stop array may be arranged in the front of the sensor as shown in FIG. 8.

Application Embodiment

Figure 10A:
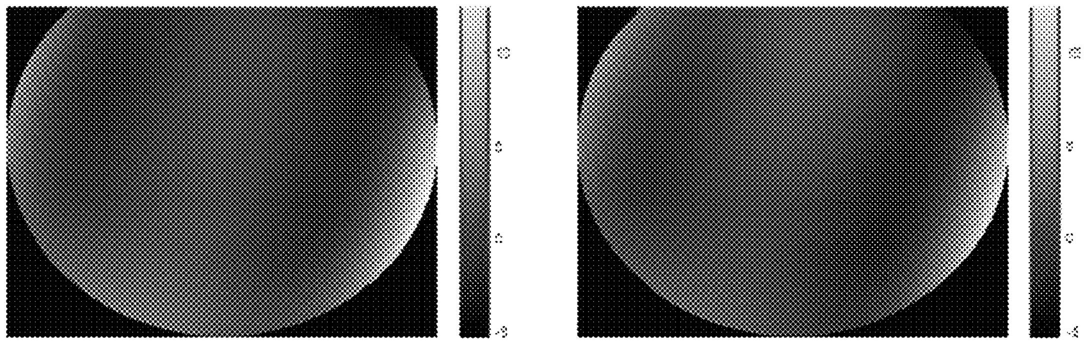
FIG. 10A, FIG. 10B, and FIG. 10C show the assumed incident wavefront distortion at 700 nm, 780 nm, and 860 nm, respectively, and the recovery wavefront distortion provided by the embodiment of the disclosure.
Figure 10B:
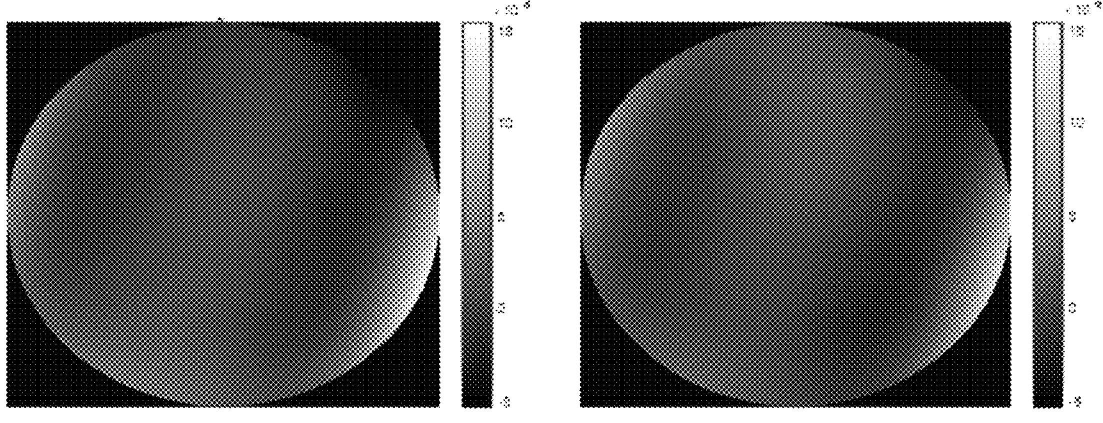
Figure 10C:
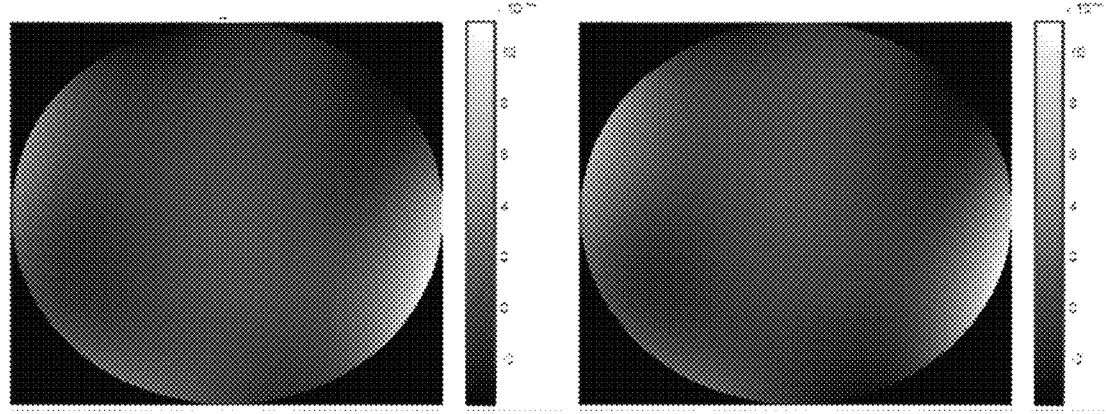
Figure 11A:
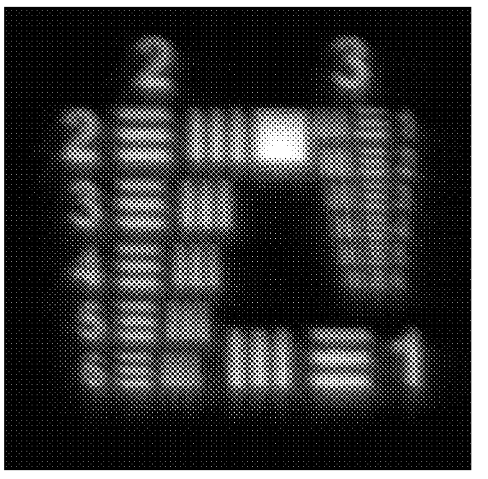
FIG. 11A and FIG. 11B show the distortion image received by the second sensor and a recovery image that recovered by the wavefront distortion.
Figure 11A:

An application embodiment of the present disclosure is described below as shown in FIG. 9 to FIG. 11 to describe the principles and technical effects of the embodiment of the present disclosure. In the present application embodiment, the working waveband is from 700 nm to 860 nm, and the central wavelength is 780 nm. The reflective and transmittive metalens arrays are arranged as shown in FIG. 1. The side length of each metalens array unit of the reflective and transmittive metalens array is 100 μm, and the side length of each single reflective and transmittive metalens array unit is 25 μm. The focal length of the transmittive metalens is 1 mm, and the focal length of the reflective metalens is 10 mm. Where $\lambda_1$=700 nm, $\lambda_2$=780 nm, $\lambda_3$=860 nm, the working waveband of the reflective metalens is 700~860 nm.

Therefore, the central wavelength of the corresponding optical filter (in this embodiment is narrow band filter array) is 700 nm 、780 nm and 860 nm, respectively, and all the band width are 10 nm.

The first sensor is CMOS with the pixel size of 3 μm, and the number of pixels is 1000×1000.

Figure 9A:
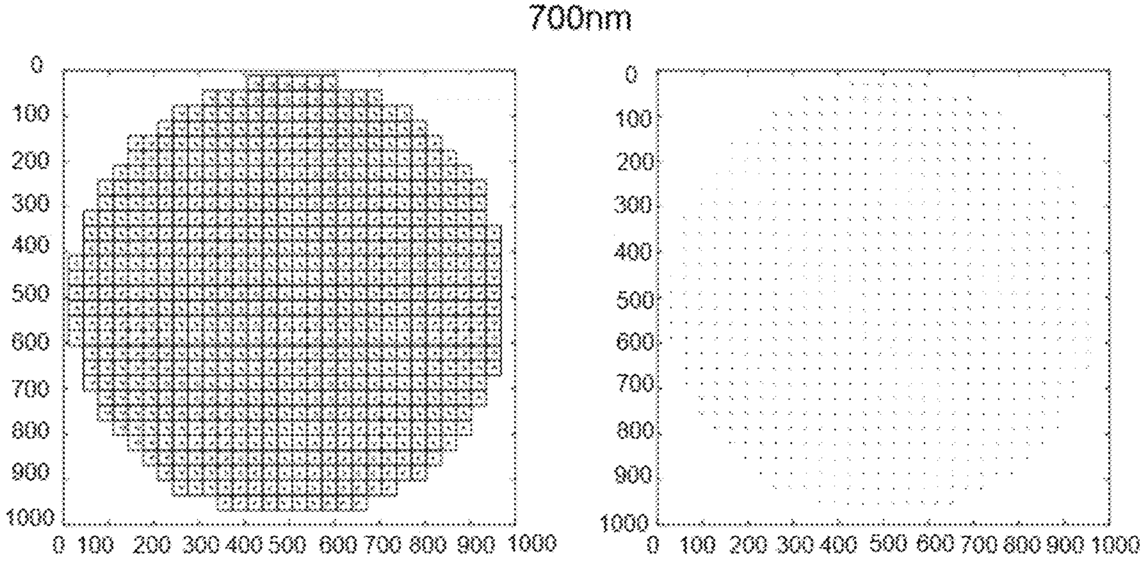
FIG. 9A, FIG. 9B and FIG. 9C show the positions and vectors of the actual focal points and the focal reference points of the sensor at 700 nm, 780 nm, and 860 nm, respectively.
Figure 9B:
Figure 9B:
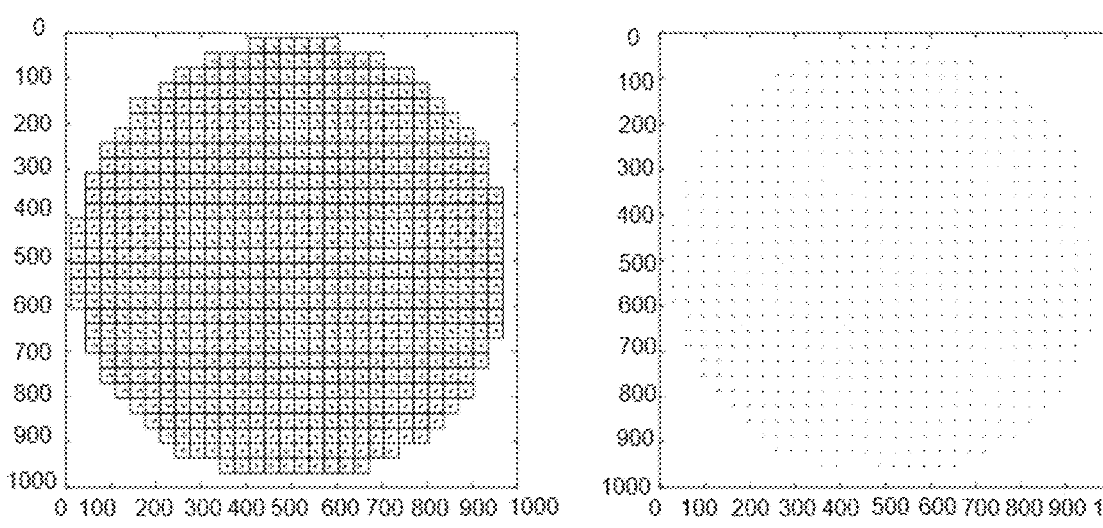
Figure 9C:
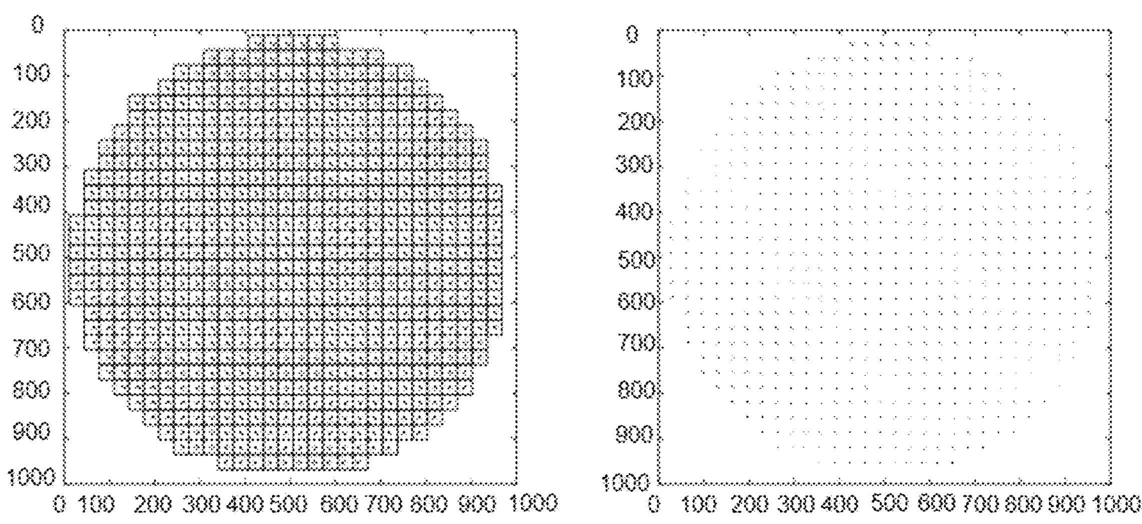
Figure 11B:
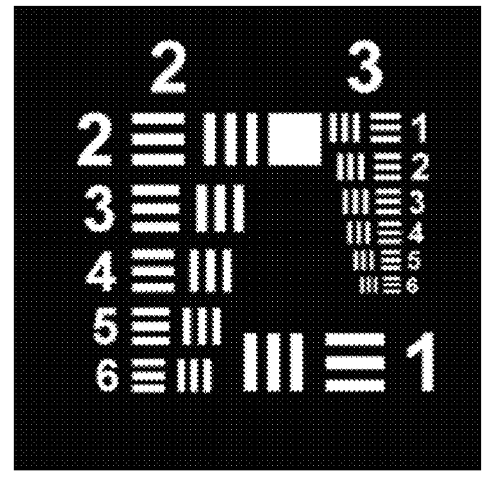

FIG. 9A to FIG. 9C show the positions and vectors of the actual focal point and focal reference points on the first sensor at 700 nm, 780 nm and 860 nm, respectively. The left figure shows the position of the focal reference point, and the right figure shows the offset of the actual focal point relative to the reference point. FIG. 10A to FIG. 10C show the assumed wavefront distortion (left figure) after filtering the incident light at 700 nm, 780 nm and 860 nm, and a recovery wavefront (right figure) provided by the embodiment of the present disclosure, respectively. The maximum difference between the assumed wavefront distortion and the recovery wavefront is 5.8%. FIG. 11A to FIG. 11B shows the distortion image received on the second sensor and an image recovered by using the wavefront distortion.

Those skilled in the field should understand that the discussion of these embodiments is exemplary only and is not intended to imply that the scope of the disclosure (including the claims) is limited to these examples; under the thinking of the present disclosure, the above embodiments or the technical features of the different embodiments may also be combined, the steps may be implemented in any order, and many other changes in different aspects of the present disclosure as described above exist to state that they are not provided in detail.

It should be emphasized that the term "include/contain" refers to the presence of features, elements, steps or components when used herein, but does not exclude the presence or addition of one or more other features, elements or components. The terms "first", "second" involving ordinal numbers do not indicate the order of implementation, or importance of the features, elements, steps or components defined by these terms, but are merely used to identify these features, elements, steps or components for the purpose of clarity.

Although the disclosure is described in accordance with a limited number of embodiments, benefiting from the above description, those skilled in the art understand that within the scope of the disclosure described herein, other embodiments may be conceived of the disclosure. Furthermore, it should be noted that the language used in this specification is chosen primarily for the purpose of readability and instruction, and not for the purpose of interpreting or defining the subject matter of the disclosure. Therefore, without departing from the scope and spirit of the attached claim, many modifications and changes are obvious to the ordinary technicians in the technical field. For the scope of the disclosure, the disclosure is illustrative but not restrictive, and the scope of the disclosure is defined by the attached claim.

What is claimed is:

1. A metalens array, wherein the metalens array comprises:

at least a metalens array unit;

and the metalens array unit comprises:

a transmittive metalens array, the transmittive metalens array comprises: a plurality of transmittive metalens at different working waveband, and the plurality of transmittive metalens have the same focal length and are used for focusing incident lights of different wavelengths to different positions of a first plane, wherein wavefront of the incident lights of different wavelengths being calculated by focus shift of the incident lights of different wavelengths; and at least a reflective metalens, the reflective metalens is used to reflect the incident light to a second plane, and the second plane is different from the first plane.

2. The metalens array of claim 1, wherein the reflective metalens is a full-spectrum reflective metalens.

3. The metalens array of claim 1, wherein the metalens array unit comprises three square transmittive metalenses, and one square reflective metalens.

4. The metalens array of claim 1, wherein the metalens array unit comprises six hexagon transmittive metalenses and one hexagon reflective metalens.

5. The metalens array of claim 1, the phase distribution of the reflective metalens is as following:

$$\begin{cases} \varphi_r(x, y) = \frac{2\pi}{\lambda}\left(f - \sqrt{(x-x_f)^2 + (y-y_f)^2 + z_f^2} + \pi\right) \\ f = \sqrt{x_f^2 + y_f^2 + z_f^2} \end{cases}$$

wherein, (xf,yf,zf) is the reflective metalens focuses the light on the focal point of a sensor, and f is the focal length of the reflective metalens.

6. The metalens array of claim 5, the phase distribution of the transmittive metalens is as following:

$$\varphi_{ML}(x, y) = \frac{2\pi}{\lambda_i}\left(f_{ML} - \sqrt{(x-x_f)^2 + (y-y_f)^2 + f_{ML}^2}\right)$$

Wherein, λi is the working wavelength of the transmittive metalens, fML is the focal length of the transmittive metalens, and (xf, yf) is the coordinates corresponding to the center of the transmittive metalens.

7. A wavefront sensor system, wherein the wavefront sensor system comprises: a metalens array, a first sensor and a second sensor;

wherein, the metalens array comprises: at least one metalens array unit, and the metalens array unit comprises:

a plurality of transmittive metalens at different working waveband; and at least one reflective metalens;

the first sensor comprises: a plurality of first sensor units;

the plurality of tansmittive metalens with the same focal length are used for focusing incident lights of different wavelengths to the corresponding first sensor unit of the first senor;

the arrangement of the first sensor unit corresponds one to one to the arrangement of the metalens array unit, and each of the first sensor units contains a focal reference point, the first sensor is used to detect the deviation between the actual focal point of each transmittive metalens and the focal reference point, the focal reference point is the theoretical focal point of the transmittive metalens on the corresponding sensor unit, wherein at least one reflective metalens is used for reflecting the incident light to the second sensor and the second sensor is used for imaging of reflected lights of the reflective metalens.

8. The wavefront sensor system of claim 7, wherein the first sensor is arranged at the focal plane of the transmittive metalens array of the metalens array.

9. The wavefront sensor system of claim 7, wherein the reflective metalens is used to image by off-axis reflection.

10. The wavefront sensor system of claim 9, wherein the wavefront distortion calculated by the transmittive metalens is used to correct the image of the reflective metalens, so as to obtain a clear image.

11. The wavefront sensor system of claim 7, wherein the wavefront sensor system further comprises:

a computing device, the computing device is used for calculating the wavefront distortion of different wavelengths of the incident light by the deviation between the actual focal point and the reference focal point, wherein the wavefront distortion is obtained by the following formula:

$$\frac{\partial W(\bar{x}, \bar{y})}{\partial x} = \frac{\Delta x(\bar{x}, \bar{y})}{f_{ML}},$$
$$\frac{\partial W(\bar{x}, \bar{y})}{\partial y} = \frac{\Delta y(\bar{x}, \bar{y})}{f_{ML}}$$

wherein, $W(\bar{x}, \bar{y})$ is the wavefront distortion, $(\bar{x}, \bar{y})$ is the phase of the the focal reference point, $f_{ML}$ is the focal length of the tansmittive metalens, $\Delta x(\bar{x}, \bar{y})$ and $\Delta y(\bar{x}, \bar{y})$ is the offset components in the x, y direction, respectively.

12. The wavefront sensor system of claim 11, wherein the computing device is used for calculating the wavefront distortion of light at different wavelengths in the incident light by measuring the deviation between the actual focal point and the focal reference point, and the calculated wavefront distortion is applied to the imaging of the second sensor, so as to obtain a recovery image that recovered by the wavefront distortion.

13. The wavefront sensor system of claim 7, wherein the wavefront sensor system further comprises: an optical filter;

the optical filter is used for filtering the light before the light reaches the metalens array unit, so as to allow only a light of specific wavelength to incidence to the metalens array unit.

14. The wavefront sensor system of claim 7, wherein the wavefront sensor system further comprises: an optical filter;

the optical filter is used for filtering the light before the light reaches the metalens array unit, so as to allow only a light of specific wavelength incidence to the metalens array unit.

15. The wavefront sensor system of claim 14, wherein the optical filter further comprises: a filter array;

the filter array is configured one-to-one correspondence with the transmittive metalens and the reflective metalens.

16. The wavefront sensor system of claim 7, wherein the metalens array unit comprises:

six hexagonal transmittive metalenses and one hexagonal reflective metalens.

17. The wavefront sensor system of claim 7, wherein the metalens array unit comprises:

three square transmittive metalenses and one square reflective metalens.

18. The wavefront sensor system of claim 7, wherein an aperture stop array is arranged between the metalens array and the first sensor.

* * * * *